United States Patent
Manchester

(10) Patent No.: US 6,831,959 B1
(45) Date of Patent: Dec. 14, 2004

(54) METHOD AND SYSTEM FOR SWITCHING BETWEEN MULTIPLE CLOCK SIGNALS IN DIGITAL CIRCUIT

(75) Inventor: E. Barton Manchester, Cotati, CA (US)

(73) Assignee: Cisco Technology, Inc., San Jose, CA (US)

( * ) Notice: Subject to any disclaimer, the term of this patent is extended or adjusted under 35 U.S.C. 154(b) by 634 days.

(21) Appl. No.: 09/635,375

(22) Filed: Aug. 9, 2000

(51) Int. Cl.[7] .................................................. H04L 7/00
(52) U.S. Cl. .................. 375/354; 375/356; 375/357; 327/145; 331/49
(58) Field of Search ................................ 375/354, 356, 375/357; 327/99, 141, 298, 407, 145; 331/49

(56) References Cited

U.S. PATENT DOCUMENTS

| | | | | |
|---|---|---|---|---|
| 4,855,616 A | * | 8/1989 | Wang et al. ............... 327/145 |
| 4,965,524 A | | 10/1990 | Patchen ...................... 328/72 |
| 5,155,380 A | * | 10/1992 | Hwang et al. ............... 327/99 |
| 5,206,817 A | | 4/1993 | McClure ..................... 364/550 |
| 5,231,636 A | | 7/1993 | Rasmussen ............... 370/100.1 |
| 5,291,528 A | * | 3/1994 | Vermeer ..................... 375/354 |
| 5,483,185 A | * | 1/1996 | Scriber et al. ............... 327/99 |
| 5,574,731 A | | 11/1996 | Qureshi ..................... 371/22.3 |
| 5,689,200 A | | 11/1997 | Ting et al. .................... 327/78 |
| 5,852,630 A | * | 12/1998 | Langberg et al. ........... 375/219 |
| 6,239,626 B1 | * | 5/2001 | Chesavage .................. 327/99 |
| 6,265,930 B1 | * | 7/2001 | Walker et al. .............. 327/407 |
| 6,323,715 B1 | * | 11/2001 | Vatinel ...................... 327/407 |

* cited by examiner

*Primary Examiner*—Shuwang Liu
(74) *Attorney, Agent, or Firm*—Baker Botts L.L.P.

(57) ABSTRACT

A method for switching between multiple clock signals in a digital circuit is provided that includes providing to a clock selector at least three distinct clock signals for the circuit. A master clock signal for the circuit is generated with the clock selector based on a first one of the distinct clock signals. The master clock signal is asynchronously blocked. The master clock signal for the circuit is generated with the clock selector based on a second one of the distinct clock signals. The master clock signal is synchronously unblocked.

26 Claims, 3 Drawing Sheets

METHOD AND SYSTEM FOR SWITCHING BETWEEN MULTIPLE CLOCK SIGNALS IN DIGITAL CIRCUIT

TECHNICAL FIELD OF THE INVENTION

This invention relates generally to the field of electronic circuits and more particularly to a method and system for switching between multiple clock signals in a digital circuit.

BACKGROUND OF THE INVENTION

In designing digital circuits for use in systems such as telecommunications networks, it is often desirable to incorporate redundancies so that a malfunction or failure of one component does not disable the entire system. For example, conventional telecommunications networks generally include two clock signals produced by two different clocks.

In switching from one clock signal to the other, it is important that no glitches occur. A glitch occurs when two rising or two falling clock edges occur in less than the period of the clock signal. If the digital circuit experiences a glitch, the set-up and hold requirements for the circuit may not be met and the flip-flops can enter an indeterminate or unstable state. This could result in unrecoverable errors.

Conventional attempts to provide switching between two clock signals without glitches fail to provide for switching between clock signals when the currently selected clock is inactive. Thus, clock signals cannot be switched using these methods when the current clock malfunctions or fails, which is one of the most important reasons for switching between clock signals.

More recently, a system for switching between clock signals has been implemented in a field-programmable gate array that provides for switching between two clock signals without requiring the currently selected clock to be active. However, in some situations, it may be desirable to switch between three or more clock signals in order to provide increased protection for critical systems in which failures cannot be tolerated.

SUMMARY OF THE INVENTION

In accordance with the present invention, a method and system for switching between multiple clock signals in a digital circuit are provided that substantially eliminate or reduce disadvantages and problems associated with previously developed systems and methods. In particular, a system may switch from an inactive clock signal to one of two or more other clock signals without producing any glitches.

In one embodiment of the present invention, a method for switching between multiple clock signals in a digital circuit is provided that includes providing to a clock selector at least three distinct clock signals for the circuit. A master clock signal for the circuit is generated with the clock selector based on a first one of the distinct clock signals. The master clock signal is asynchronously blocked. The master clock signal for the circuit is generated with the clock selector based on a second one of the distinct clock signals. The master clock signal is synchronously blocked.

Technical advantages of the present invention include providing an improved digital circuit for a telecommunications node or other suitable application. In particular, the circuit switches glitchlessly between clock signals. As a result, when the circuit switches from one clock signal to another, the circuit continues to function properly.

Another technical advantage of the present invention includes an improved method and system for switching between multiple clock signals in a digital circuit. In particular, switching may be accomplished without relying on the currently active clock. As a result, when a selected clock malfunctions or fails, the clock signal for the circuit may be switched to a functioning clock signal. Accordingly, the switch is glitchless even if the original clock signal has become inactive.

Another technical advantage of the present invention includes providing a highly reliable digital circuit. In particular, the circuit may employ and switch between three or more clock signals. As a result, greater protection is provided through the use of multiple back-up clocks. Accordingly, critical systems in which failures cannot be tolerated are more stable when the system and method of the present invention are implemented as a part of those systems.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
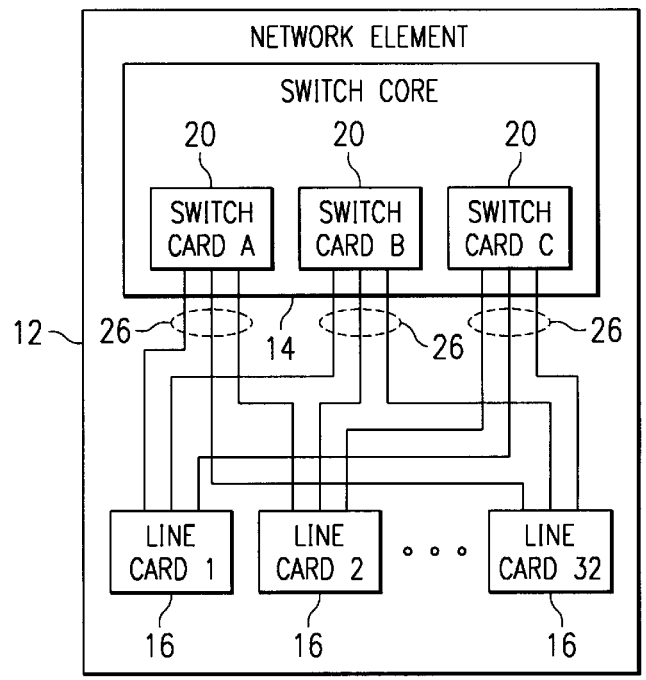
FIG. 1 is a block diagram illustrating a network element having a plurality of switch cards and a plurality of line cards for use in a telecommunications network in accordance with one embodiment of the present invention.

FIG. 1 is a block diagram illustrating a network element 12 for use in a telecommunications network in accordance with one embodiment of the present invention. A telecommunications network is a network that transmits voice, audio, video or other suitable types of information, and/or a combination of different types of information between source and destination points. The network element 12 comprises a switch core 14 and a plurality of line cards 16. The switch core 14 comprises a plurality of switch cards 20.

The network element 12 may be part of an integrated access device that transmits data to and receives data from customer premise equipment, such as standard telephones, modems, computers, data phones and other devices capable of generating traffic for transmission in the telecommunications network. In accordance with one embodiment of the present invention, the integrated access device is implemented in a card shelf configuration with functionality of the device distributed between discrete cards 16 and 20 connected over a back plane. The back plane includes a plurality of slots. The slots include receptors for receiving one or more line cards 16 and one or more switch cards 20. The back plane also includes one or more transmission buses 26 for connecting the cards 16 and 20. It will be understood that other types of access devices may be used in connection with the present invention.

The line cards 16 and the switch cards 20 are each a discrete card configured to plug into the back plane. The cards 16 and 20 each include logic stored in a computer-processable medium. The logic may be encoded in hardware and/or software instructions stored in RAM, ROM and/or other suitable computer-readable media for performing the functions associated with the cards 16 and 20. As used herein, each means every one of at least a subset of the identified items.

Referring to FIG. 1, the switch core 14 transmits and receives customer traffic for the telecommunications network. The switch core 14 may be any suitable telecommunications switch capable of routing voice or other data traffic. According to one embodiment, the switch core 14 performs synchronous-based switching such as time-division multiplex (TDM) switching and cell-based switching based on a synchronized frame pulse. TDM-based switching provides time slot interchange for telephony connections, SONET SPEs, other synchronized traffic, and asynchronous traffic segmented into time slots. The cell-based switching switches asynchronous transport mode (ATM) cell traffic, ATM adaption layer cell traffic, and segmented packet traffic on a frame-based schedule. The switch core 14 may also convert traffic between the TDM and ATM realms to establish cross-connections between the line cards 16.

The switch core 14 receives and processes the TDM and ATM traffic using TDM-based switching and ATM cell-based switching. In switching service traffic received from the line cards 16, the switch core 14 performs queue management as well as broadcast and multicast operations. It will be understood that the line cards 16 and switch core 14 may each perform additional or different functions. It will be further understood that identified functions of the line cards 16 and the switch core 14 may be suitably off-loaded to the other.

In accordance with one embodiment, the switch cards 20 provide functions such as master control, switching, communication within and outside of the network element 12, data storage, and the like. Although the embodiments shown in FIGS. 1–3 and 5 include three switch cards 20 producing three distinct clock signals, it will be understood that any suitable number of switch cards 20 may be used to produce a number of distinct clock signals without departing from the scope of the present invention.

The line cards 16 allow features and capacity to be incrementally added to the network element 12. For example, the features may include access ports, interworking functions, layer 3 services or other suitable features. In one embodiment, communication between the switch cards 20 and the line cards 16 is provided over time-slot buses 26.

Figure 2:
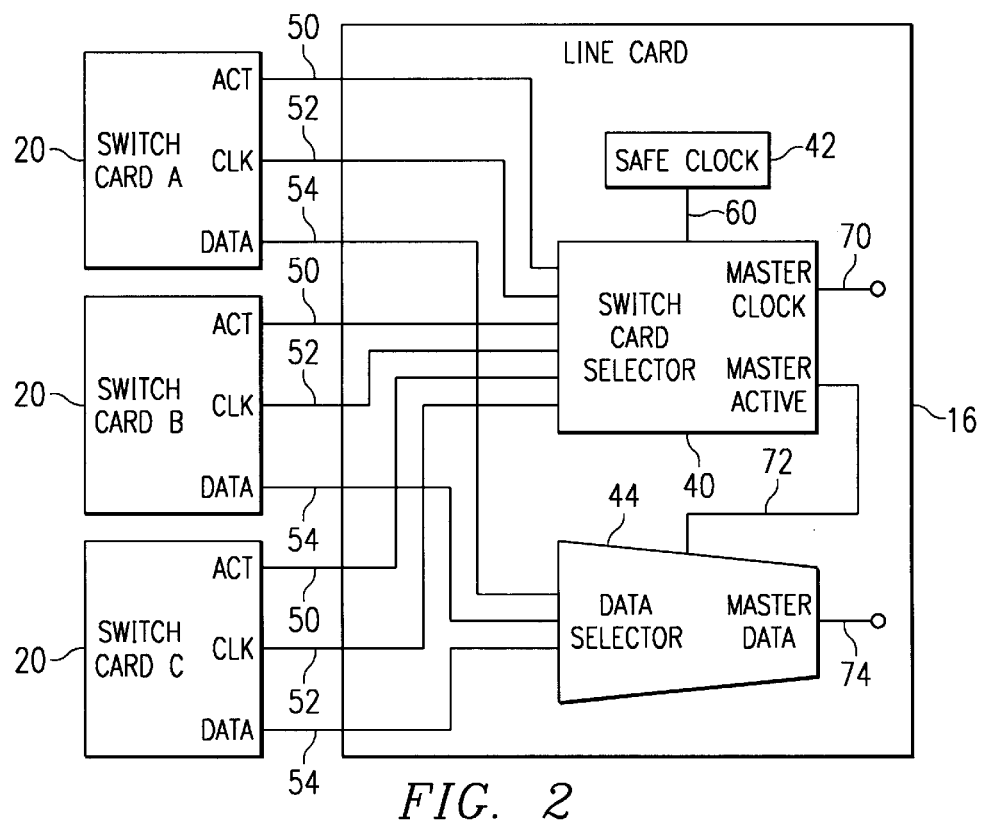
FIG. 2 is a block diagram illustrating one embodiment of one of the line cards of FIG. 1 having a switch card selector.

FIG. 2 is a block diagram illustrating one embodiment of a line card 16 constructed in accordance with the teachings of the present invention. The line card 16 comprises a switch card selector 40 for selecting a switch card 20, a safe clock 42 for providing a safe clock signal to the switch card selector 40, and a data selector 44 for selecting data. The switch card selector 40 and data selector 44 act in concert to select a clock signal and data, respectively, from the same switch card 20. As shown in FIG. 2, each switch card 20 provides an active signal on line 50 to the switch card selector 40, a clock signal on line 52 to the switch card selector 40, and a data signal on line 54 to the data selector 44. The active signal comprises data indicating whether the corresponding switch card 20 is active. The clock signal comprises an oscillating signal. The data signal comprises any suitable data for providing information from the switch card 20 to the line cards 16.

The safe clock 42 provides a safe clock signal to the switch card selector 40 on line 60. The switch card selector 40 operates based on the safe clock signal, which comprises an oscillating signal. The speed of the safe clock signal is less than or equal to the slowest speed of the clock signals provided by the switch cards 20 on lines 52.

The switch card selector 40 selects one of the switch cards 20 to communicate with the line card 16. The switch card selector 40 may make this selection in accordance with any suitable criteria for selecting between switch cards 20 that are currently active and functioning properly. For example, the switch card selector 40 may select Switch Card A 20 as a default, although any one or more other switch cards 20 may also be active and functioning properly. If Switch Card A 20 is inactive or malfunctioning, the switch card selector 40 may then select Switch Card B 20, followed by Switch Card C 20. Alternatively, at any particular time, a single switch card 20 may be active, while the remaining switch cards 20 are inactive. In this embodiment, the switch card selector 40 determines which switch card 20 is active and selects that switch card 20. It will be understood that the switch card selector 40 may select a switch card 20 in any other suitable manner without departing from the scope of the present invention.

The line card 16 operates based on the clock and data signals from the selected switch card 20. The switch card selector 40 provides a master clock signal, which comprises the clock signal from the selected switch card 20, on a master clock line 70 for the line card 16 and a master active signal, which comprises the active signal from the selected switch card 20, on a master active line 72 for the line card 16. The master active signal on line 72 is provided to the data selector 44 to allow the data selector 44 to provide on the master data line 74 the data signal from the data signal line 54 corresponding to the selected switch card 20. According to one embodiment, the data selector 44 comprises a multiplexer or other suitable many-to-one device for receiving multiple signals as inputs and selecting one of the signals for an output.

Figure 3:
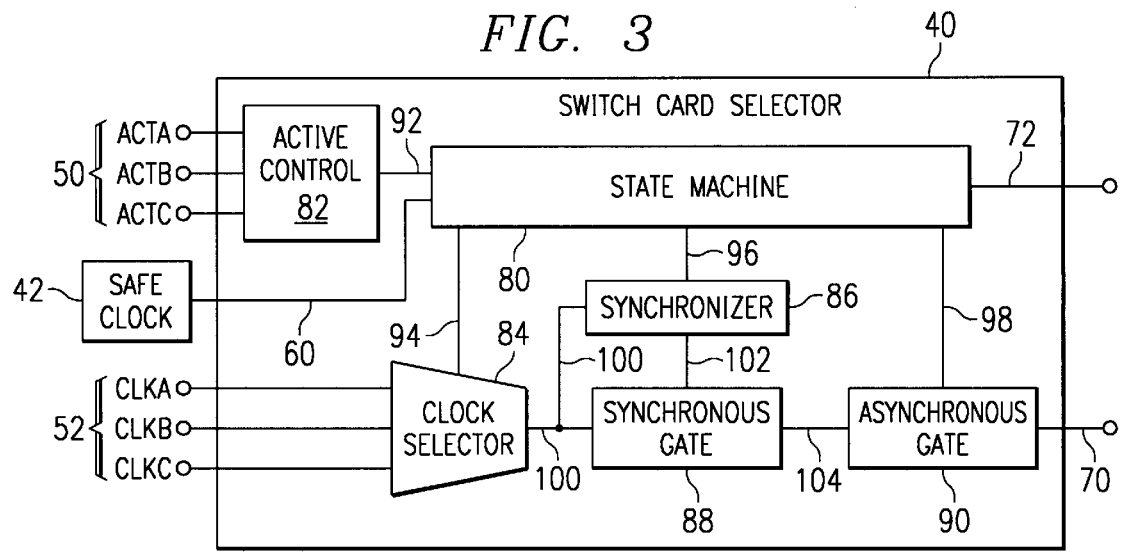
FIG. 3 is a block diagram illustrating one embodiment of the switch card selector of FIG. 2.

FIG. 3 is a block diagram illustrating one embodiment of the switch card selector 40. The switch card selector 40 comprises a state machine 80 for switching the master clock signal on line 70 between multiple clock signals and the master active signal on line 72 between multiple active signals, an active control 82 for switching the active signal on line 92 between multiple active signals, a clock selector 84 for selecting a clock signal, a synchronizer 86 for synchronizing a signal from the state machine 80, a synchronous gate 88 for synchronously blocking or passing through a clock signal, and an asynchronous gate 90 for asynchronously blocking or passing through the clock signal.

The state machine 80 receives the safe clock signal on line 60 from the safe clock 42 and receives an active signal on line 92 from the active control 82. The state machine 80 generates a master active signal for the line card 16 on the master active line 72 and for the clock selector 84 on line 94. The state machine 80 generates inhibit and non-inhibit signals which are provided on line 96 to the synchronizer 86 and to the synchronous gate 88 from the synchronizer 86 on line 102 and which are also provided to the asynchronous gate 90 on line 98. These signals generated by the state machine 80 allow the master clock signal provided on line 70 to be switched from one clock signal to another without glitches, as described in more detail below in connection with FIG. 4. The non-inhibit signal may comprise the absence of the inhibit signal, the removal of the inhibit signal, or any other suitable signal. The state machine 80 may be implemented in an application-specific integrated circuit, a field-programmable gate array, discrete logic, software and the like.

The active control 82 receives the active signals from the switch cards 20 on lines 50, makes a decision as to which switch card 20 is to be selected, and provides the corresponding active signal on line 92 to the state machine 80. If the currently selected switch card 20 malfunctions or ceases to function altogether or if other suitable reasons exist for selecting a new switch card 20, the active control 82 selects the new switch card 20 and provides a new active signal to the state machine 80 on line 92. The active control 82 may determine which switch card 20 to select based on a pre-defined hierarchy of existing switch cards 20 or other suitable selection criteria, as described above in connection with FIG. 2.

The clock selector 84 receives the clock signals from the switch cards 20 on the clock lines 52. Based on the active signal received by the clock selector 84 from the state machine 80 on line 94, the clock selector 84 provides the corresponding clock signal from the clock lines 52 to the synchronizer 86 and the synchronous gate 88 on lines 100.

According to one embodiment, the clock selector 84 comprises a multiplexer or other suitable many-to-one device for receiving multiple signals as inputs and selecting one of the signals for an output. The synchronizer 86 comprises a double flip-flop or other suitable device for synchronizing the output of the synchronous gate 88 with the signal from the clock selector 84. The synchronous gate 88 comprises a logic gate or other suitable device for passing or blocking the signal from the clock selector 84 based on a signal from the synchronizer 86. The asynchronous gate 90 comprises a logic gate or other suitable device for passing or blocking the signal from the synchronous gate 88 based on a signal from the state machine 80.

During normal operations, while no transitions between clock signals are occurring, the clock signal from the clock selector 84 on line 100 is passed through the synchronous gate 88 to line 104, through the asynchronous gate 90 and to the master clock line 70 for use as the master clock signal in the line card 16. However, when a transition between clock signals is occurring, the synchronous gate 88 and the asynchronous gate 90 block the signals received on lines 100 and 104, respectively, such that the master clock signal on the master clock line 70 remains a steady signal while the transition is occurring, thus preventing glitches. After the transition is complete, the synchronous gate 88 and the asynchronous gate 90 again pass the signals through such that the newly selected clock signal from one of the clock lines 52 is provided at the master clock line 70 without glitches.

Figure 4:
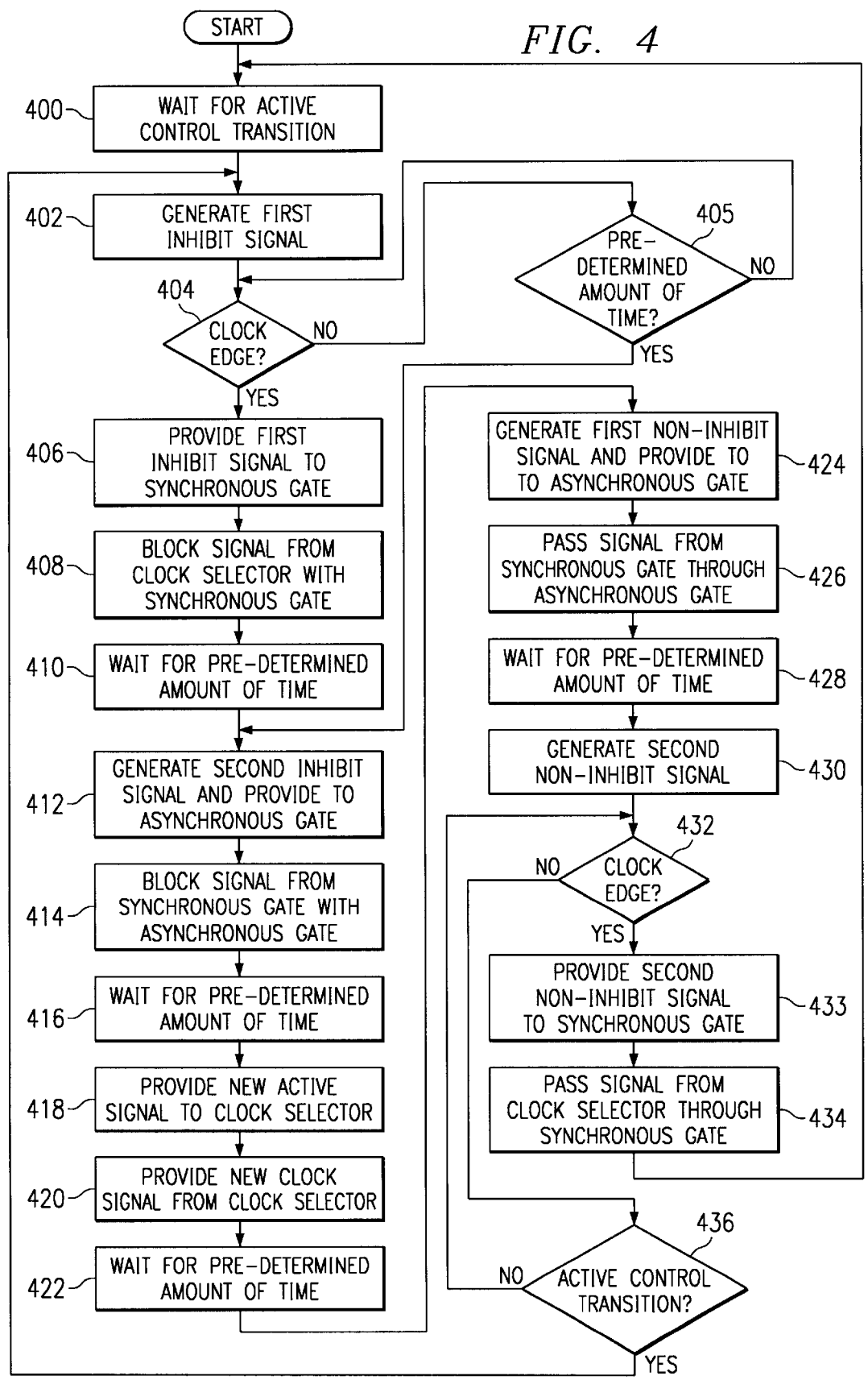
FIG. 4 is a flow diagram illustrating a method for switching between multiple clock signals using the switch card selector of FIG. 3 in accordance with one embodiment of the present invention.

FIG. 4 is a flow diagram illustrating a method for switching between multiple clock signals in accordance with one embodiment of the present invention. The method begins at step 400 where the state machine 80 waits for the signal on line 92 from the active control 82 to transition from one active signal to another, indicating that a new switch card 20 other than the currently selected switch card 20 is to be used for communicating with the line card 16. In response to the active signal transitioning, the state machine 80 generates a first inhibit signal on line 96 that is received by the synchronizer 86 in step 402.

At decisional step 404, the synchronizer 86 attempts to detect a rising clock edge for the currently selected clock signal from the clock selector 84. In an alternative embodiment, the synchronizer 86 attempts to detect a falling clock edge. If the synchronizer 86 does not detect the clock edge, the method follows the No branch from decisional step 404 to decisional step 405 where a determination is made regarding whether a pre-determined amount of time has passed. If the pre-determined amount of time has not passed, the method follows the No branch from decisional step 405 and returns to decisional step 404. Thus, the method does not continue until the clock edge is detected or the pre-determined amount of time has passed.

Returning to decisional step 404, if the clock edge is detected by the synchronizer 86, the method follows the Yes branch from decisional step 404 to step 406 where the synchronizer 86 provides the first inhibit signal to the synchronous gate 88 on line 102. At step 408, in response to the first inhibit signal, the synchronous gate 88 blocks the signal from the clock selector on line 100 from passing through to line 104 and instead provides a steady high signal on line 104. An action is taken in response to an event when the action is prompted by and taken subsequent to the event. For the embodiment in which the synchronizer 86 attempts to detect the falling clock edge, the synchronous gate 88 provides a steady low signal on line 104. Thus, the output of the synchronous gate 88 is synchronized with the clock signal from the clock selector 84. In this way, glitches are avoided while the clock signal is being switched.

At step 410, the state machine 80 waits, after generating the first inhibit signal, for a pre-determined amount of time before continuing. This pre-determined amount of time corresponds to the pre-determined amount of time in decisional step 405. In addition, this pre-determined amount of time, as well as the pre-determined amounts of time described below, is based on the period of the clock signals provided on lines 52. According to one embodiment, the pre-determined amounts of time are at least twice the clock speed for the slowest clock signal received on lines 52. This ensures that two rising or two falling clock edges will not occur in less than the period of the clock signal, i.e., that no glitches will occur. Thus, it will be understood that the pre-determined amounts of time may be any suitable amounts that ensure no glitches will occur while the clock signals are being switched.

Returning to decisional step 405, if the pre-determined amount of time has passed without the synchronizer 86 detecting the clock edge, the method follows the Yes branch from decisional step 405 to step 412. Thus, in this situation or after waiting for the pre-determined amount of time in step 410, the state machine 80 generates a second inhibit signal and provides the second inhibit signal to the asynchronous gate 90 on line 98 in step 412.

At step 414, in response to the second inhibit signal, the asynchronous gate 90 blocks the signal from the synchronous gate 88 on line 104 and continues to provide on the master clock line 70 the steady signal that was received on line 104 before the second inhibit signal was received.

At step 416, the state machine 80 waits, after generating the second inhibit signal, for a pre-determined amount of time that is sufficient to ensure that the asynchronous gate 90 is blocking the signal from the synchronous gate 88. After the pre-determined amount of time, the state machine 80 provides the new active signal received from the active control 82 to the clock selector 84 on line 94 in step 418.

At step 420, the clock selector 84 provides the new clock signal on line 100, in accordance with the new active signal on line 94. If the originally selected clock signal was not oscillating such that the method followed the Yes branch from decisional step 405 to step 412, the new clock signal, if oscillating, will provide the clock edge which causes the synchronizer 86 to provide the first inhibit signal to the synchronous gate 88. Thus, the synchronous gate 88 will block the signal from the clock selector 84 based on the new clock signal in this situation.

At step 422, the state machine 80 waits, after providing the new active signal to the clock selector 84 on line 94, for a pre-determined amount of time that is sufficient to ensure that the clock selector 84 is providing the new clock signal on line 100. After the pre-determined amount of time, the state machine 80 generates a first non-inhibit signal that is received by the asynchronous gate 90 on line 98 in step 424. At step 426, in response to the first non-inhibit signal, the asynchronous gate 90 unblocks the signal from the synchronous gate 88 on line 104 and passes the signal through to the master clock line 70.

At step 428, the state machine 80 waits, after generating the first non-inhibit signal, for a pre-determined amount of time that is sufficient to ensure that the asynchronous gate 90 is passing the signal from the synchronous gate 88 through to the master clock line 70. After the pre-determined amount of time, the state machine 80 generates a second non-inhibit signal that is received by the synchronizer 86 on line 96 in step 430.

At decisional step 432, the synchronizer 86 attempts to detect a rising clock edge for the new clock signal provided by the clock selector 84 on line 100. As previously described, the synchronizer 86 may also attempt to detect a falling clock edge. If the synchronizer 86 detects the clock edge in decisional step 432, the method follows the Yes branch from decisional step 432 to step 433 where the synchronizer 86 provides the second non-inhibit signal to the synchronous gate 88 on line 102. At step 434, the synchronous gate 88 unblocks the signal from the clock selector 84 on line 100 and passes the signal through to line 104.

Thus, the output of the synchronous gate 88 is synchronized with the signal from the clock selector 84. This ensures that no glitches will occur while the clock signals are being switched. The method then returns to step 400 where the state machine 80 waits for another transition in the signal on line 92 from the active control 82.

Returning to decisional step 432, if the synchronizer 86 does not detect the clock edge, the method follows the No branch from decisional step 432 to decisional step 436. At decisional step 436, a determination is made regarding whether the signal on line 92 from the active control 82 has transitioned to a different active signal. If no transition has occurred, the method follows the No branch from decisional step 436 and returns to decisional step 432 where the synchronizer 86 attempts to detect the appropriate clock edge for the new clock signal provided by the clock selector 84 on line 100. However, if a transition has occurred, the method follows the Yes branch from decisional step 436 and returns to step 402 where the state machine 80 generates a first inhibit signal as previously described. Thus, in the event that the new clock was not oscillating, yet another clock signal may be provided by the clock selector 84, resulting in the method being repeated until a working clock is selected.

Figure 5:
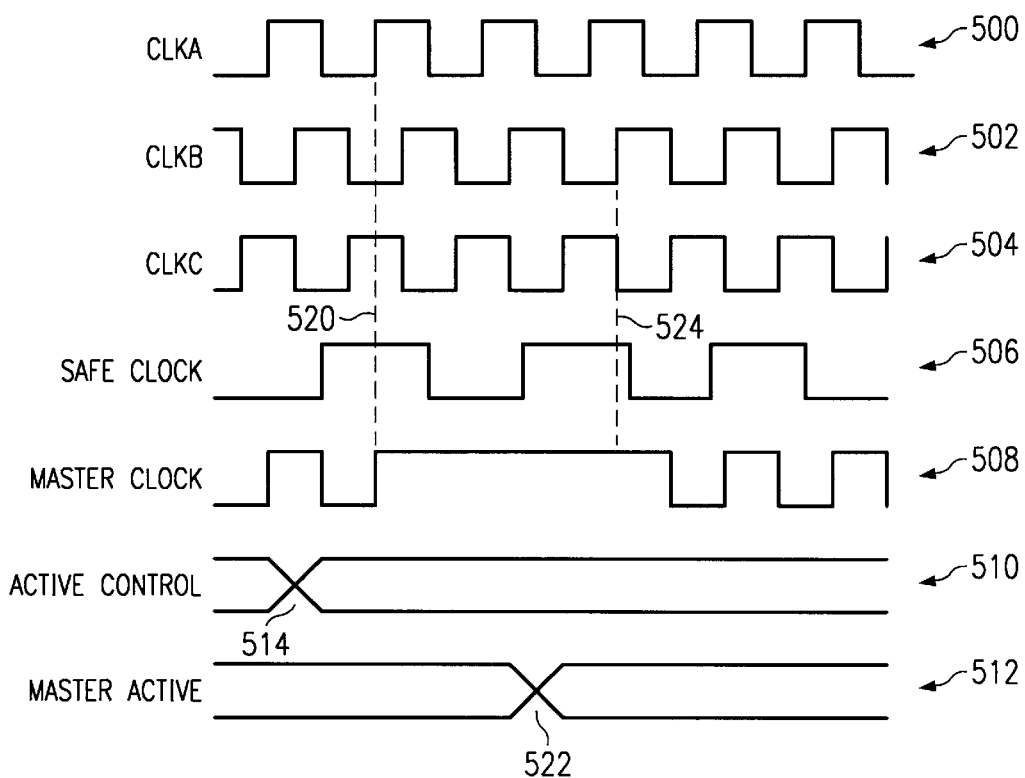
FIG. 5 is a timing diagram illustrating clock signals and active signals for a digital circuit such as the line card of FIG. 2 in which the clock signal for the circuit is switched between multiple clock signals in accordance with the teachings of the present invention.

FIG. 5 is a timing diagram illustrating clock signals 500, 502, 504, 506 and 508 and active signals 510 and 512 for a digital circuit in which the master clock signal for the circuit is switched between multiple clock signals in accordance with the teachings of the present invention. Clock signals 500, 502 and 504 correspond to three distinct clock signals provided by three discrete switch cards 20. Clock signal 506 corresponds to a signal provided by the safe clock 42. Clock signal 508 corresponds to the master clock signal for a line card 16 provided on the master clock line 70. Active signal 510 corresponds to the signal provided by active control 82 to the state machine 80 on line 92. Active signal 512 corresponds to the master active signal provided by the state machine 80 on line 94 to the clock selector 84 and on the master active line 72 for the line card 16.

In accordance with an exemplary embodiment, the master clock signal 508 is switched between the clock A signal 500 and the clock B signal 502. It will be understood that the master clock signal 508 may be switched between any of the clock signals 500, 502 and 504 in accordance with the teachings of the present invention.

As shown in FIG. 5, the master clock signal 508 originally corresponds to the clock A signal 500. At point 514, the active signal 510 transitions such that switch card B 20 is selected instead of switch card A 20. At line 520, as the next rising clock edge of the clock A signal 500 following point 514 occurs, the master clock signal 508 is held at a steady high level while the transition takes place. At point 522, the master active signal 512 transitions to correspond to the active signal 510. At line 524, as the next rising clock edge for the clock B signal 502 occurs following point 522, the master clock signal 508 corresponds to the clock B signal 502. In this way, the master clock signal 508 for the line card 16 is switched between multiple clock signals without glitches.

Although the present invention has been described with several embodiments, various changes and modifications may be suggested to one skilled in the art. It is intended that the present invention encompasses such changes and modifications as fall within the scope of the appended claims.

What is claimed is:

1. A method for switching between multiple clock signals in a digital circuit, comprising:
   providing to a clock selector at least three distinct clock signals for a circuit;
   generating on a master clock output of the clock selector a first master clock signal for the circuit based on a first one of the distinct clock signals;
   asynchronously blocking the master clock output in response to an inhibit signal;
   generating on the master clock output a second master clock signal for the circuit based on a second one of the distinct clock signals; and
   synchronously unblocking the master clock output.

2. The method of claim 1, further comprising synchronously blocking the master clock output prior to asynchronously blocking the master clock output.

3. The method of claim 2, synchronously blocking the master clock output comprising blocking the master clock output in response to a first inhibit signal and a clock edge of the first distinct clock signal and asynchronously blocking the master clock output comprising blocking the master clock output in response to a second inhibit signal.

4. The method of claim 1, further comprising asynchronously unblocking the master clock output prior to synchronously unblocking the master clock output.

5. The method of claim 4, asynchronously unblocking the master clock output comprising unblocking the master clock output in response to a first non-inhibit signal and synchronously unblocking the master clock output comprising unblocking the master signal in response to a second non-inhibit signal and a clock edge of the second distinct clock signal.

6. The method of claim 1, synchronously unblocking the master clock output comprising unblocking the master clock output in response to a non-inhibit signal and a clock edge of the second distinct clock signal.

7. A system for switching between multiple clock signals in a digital circuit, comprising:
    a state machine operable to generate an inhibit signal and a non-inhibit signal;
    a clock selector coupled to the state machine, the clock selector operable to receive at least three distinct clock signals and to select one of the distinct clock signals as a master clock signal for the circuit;
    a synchronizer coupled to the state machine and the clock selector;
    a synchronous gate coupled to the clock selector and the synchronizer, the synchronous gate and the synchronizer operable to synchronously unblock the master clock signal from the clock selector based on the non-inhibit signal from the state machine and to synchronously block the master clock signal from the clock selector based on the inhibit signal from the state machine; and
    an asynchronous gate coupled to the state machine and the synchronous gate, the asynchronous gate operable to asynchronously unblock the master clock signal from the synchronous gate based on the non-inhibit signal from the state machine and to asynchronously block the master clock signal from the synchronous gate based on the inhibit signal from the state machine.

8. The system of claim 7, the synchronizer further operable to receive the inhibit signal from the state machine, detect a clock edge for a first one of the distinct clock signals, and provide the inhibit signal to the synchronous gate in response to the clock edge for the first distinct clock signal.

9. The system of claim 8, the synchronous gate further operable to block the master clock signal in response to the inhibit signal from the synchronizer.

10. The system of claim 7, the synchronizer further operable to receive the non-inhibit signal from the state machine, to detect a clock edge for a second one of the distinct clock signals and to provide the non-inhibit signal to the synchronous gate in response to the clock edge for the second distinct clock signal.

11. The system of claim 10, the synchronous gate further operable to unblock the master clock signal in response to the non-inhibit signal from the synchronizer.

12. The system of claim 7, wherein the state machine is implemented in an application-specific integrated circuit.

13. A system for switching between multiple clock signals in a digital circuit, comprising:
    a computer-readable medium; and
    logic stored on the computer-readable medium, the logic operable to generate on a master clock output a first master clock signal for the circuit based on a first one of at least three distinct clock signals, to generate an inhibit signal, to asynchronously block the master clock output in response to the inhibit signal, to generate on the master clock output a second master clock signal for the circuit based on a second one of the distinct clock signals, and to synchronously unblock the master clock output.

14. The system of claim 13, the logic further operable to generate a non-inhibit signal and to synchronously unblock the master clock output in response to the non-inhibit signal.

15. The system of claim 13, the logic further operable to asynchronously unblock the master clock output prior to synchronously unblocking the master clock output.

16. The system of claim 13, the logic further operable to block the master clock output in response to a clock edge for the first distinct clock signal.

17. The system of claim 13, the logic further operable to unblock the master clock output in response to a clock edge for the second distinct clock signal.

18. A method for switching between multiple clock signals in a digital circuit, comprising:
    providing to a clock selector at least three distinct clock signals for the circuit;
    generating on a master clock output of the clock selector a first master clock signal for the circuit based on a first one of the distinct clock signals;
    generating an inhibit signal;
    blocking the master clock output in response to the inhibit signal;
    generating with the clock selector a second master clock signal for the circuit based on a second one of the distinct clock signals;
    generating a non-inhibit signal;
    detecting a clock edge for the second distinct clock signal; and
    unblocking the master clock output in response to the non-inhibit signal and the clock edge for the second distinct clock signal.

19. The method of claim 18, further comprising:
    detecting a clock edge for the first distinct clock signal; and
    blocking the master clock output in response to the inhibit signal by blocking the master clock signal in response to the inhibit signal and the clock edge for the first distinct clock signal.

20. A system for switching between multiple clock signals in a digital circuit, comprising:
    means for providing to a clock selector at least two distinct clock signals for a circuit;
    means for generating on a master clock output of the clock selector a first master clock signal for the circuit based on a first one of the distinct clock signals;
    means for asynchronously blocking the master clock output in response to an inhibit signal;
    means for generating on the master clock output a second master clock signal for the circuit based on a second one of the distinct clock signals; and
    means for synchronously unblocking the master clock output.

21. A system for switching between multiple clock signals in a digital circuit, comprising:
    a state machine operable to generate a first inhibit signal and a second inhibit signal and a first non-inhibit signal and a second non-inhibit signal;

a clock selector coupled to the state machine, the clock selector operable to receive a plurality of distinct clock signals and to select one of the distinct clock signals as a master clock signal for the circuit;

a synchronizer coupled to the state machine and the clock selector;

a synchronous gate coupled to the clock selector and the synchronizer, the synchronous gate and the synchronizer operable to synchronously unblock the master clock signal received from the clock selector based on the first non-inhibit signal from the state machine and to synchronously block the master clock signal received from the clock selector based on the first inhibit signal from the state machine; and an asynchronous gate coupled to the state machine and the synchronous gate, the asynchronous gate operable to asynchronously unblock the master clock signal received from the synchronous gate based on the second non-inhibit signal from the state machine and to asynchronously block the master clock signal received from the synchronous gate based on the second inhibit signal from the state machine.

22. The system of claim 21, the synchronizer further operable to receive the first inhibit signal from the state machine, detect a clock edge for a first one of the distinct clock signals, and provide the first inhibit signal to the synchronous gate in response to the clock edge for the first distinct clock signal.

23. The system of claim 22, the synchronous gate further operable to block the master clock signal in response to the first inhibit signal from the synchronizer.

24. The system of claim 21, the synchronizer further operable to receive the first non-inhibit signal from the state machine, to detect a clock edge for a second one of the distinct clock signals and to provide the first non-inhibit signal to the synchronous gate in response to the clock edge for the second distinct clock signal.

25. The system of claim 24, the synchronous gate further operable to unblock the master clock signal in response to the first non-inhibit signal from the synchronizer.

26. The system of claim 21, wherein the state machine is implemented in an application-specific integrated circuit.

* * * * *

UNITED STATES PATENT AND TRADEMARK OFFICE
CERTIFICATE OF CORRECTION

PATENT NO. : 6,831,959 B1
DATED : December 14, 2004
INVENTOR(S) : E. Barton Manchester It is certified that error appears in the above-identified patent and that said Letters Patent is hereby corrected as shown below:

Title page,
Item [54], Title, after "SIGNALS IN", insert -- A --.

Signed and Sealed this

Thirty-first Day of January, 2006

JON W. DUDAS
*Director of the United States Patent and Trademark Office*